Sept. 24, 1968 R. J. MARCHETTI 3,402,854
JUICE MACHINE
Filed March 23, 1967 2 Sheets-Sheet 1

INVENTOR.
RICHARD J. MARCHETTI
BY
Paul + Paul
ATTORNEYS.

United States Patent Office 3,402,854
Patented Sept. 24, 1968

3,402,854
JUICE MACHINE
Richard J. Marchetti, Norristown, Pa., assignor to Milli-Switch Corporation, Gladwyne, Pa., a corporation of Pennsylvania
Filed Mar. 23, 1967, Ser. No. 625,414
5 Claims. (Cl. 222—76)

ABSTRACT OF THE DISCLOSURE

A plastic bag of juice concentrate has an outlet connected to a short length of rubber hose. The bag is disposed in a machine so that the hose hangs vertically. A spring biased bar normally impinges on the hose and prevents the juice concentrate from flowing down through the hose. The other end of the hose is connected to a mixing chamber. A water line is likewise connected to the mixing chamber downstream of the connection to the hose. The connection between the mixing chamber and the water line is such that water will flow vertically downwardly in the mixing chamber at an acute angle to the normal direction of flow through the mixing chamber. The water line is controlled by an electric valve. The bar impinging on the hose is connected to a solenoid which when activated will remove the bar from the hose and allow juice concentrate to flow therethrough. Both the electric valve on the water line and the solenoid controlling the bar are simultaneously controlled by a push button electric switch. When the button is pushed, juice concentrate will flow through the hose and be mixed with water in the mixing chamber, and the resulting juice mixture will be discharged downstream from the chamber.

Background of the invention

This invention relates to apparatus for mixing juice concentrate with water, and more particularly, to apparatus for use in restaurants, and the like, for automatically mixing a predetermined amount of juice concentrate with a predetermined amount of water at the touch of a button.

In the prior art, many devices have been used for dispensing juice concentrate mixed with water. One of the drawbacks of the commonly used prior art devices, is their complexity which results in a considerable amount of "down time" in cleaning and refilling the machines. This down time becomes particularly important to restaurant owners and the like, who require a continuous supply of such juices during peak periods, such as the early hours of the day when breakfast is being served.

Summary of the invention

The present invention covers an apparatus for dispensing juice comprising disposable means for feeding a controlled amount of juice concentrate by gravity to a mixing means wherein said concentrate is mixed with a predetermined amount of water and from which the resulting juice mixture is dispensed, upon actuation of an electrical switch.

In the preferred embodiment of this invention, the water and the juice concentrate are chilled prior to being dispensed and the apparatus is so arranged that only the mixing means requires cleaning.

In an alternative embodiment of this invention, the mixing means is provided with means to produce a foaming action during mixing so that the juice is dispensed in a foamy state.

Accordingly, an object of this invention is to provide a simple, effective, and easy-to-clean apparatus for dispensing juice.

Another object of this invention is to provide a hygienic apparatus for dispensing juice wherein part of the apparatus in contact with the juice concentrate is disposable, and wherein those parts in contact with the juice which are not disposable are easily accessible for cleaning.

These and other objects of the invention will become evident from the following description with reference to the drawings.

Description of the preferred embodiments

Figure 1:
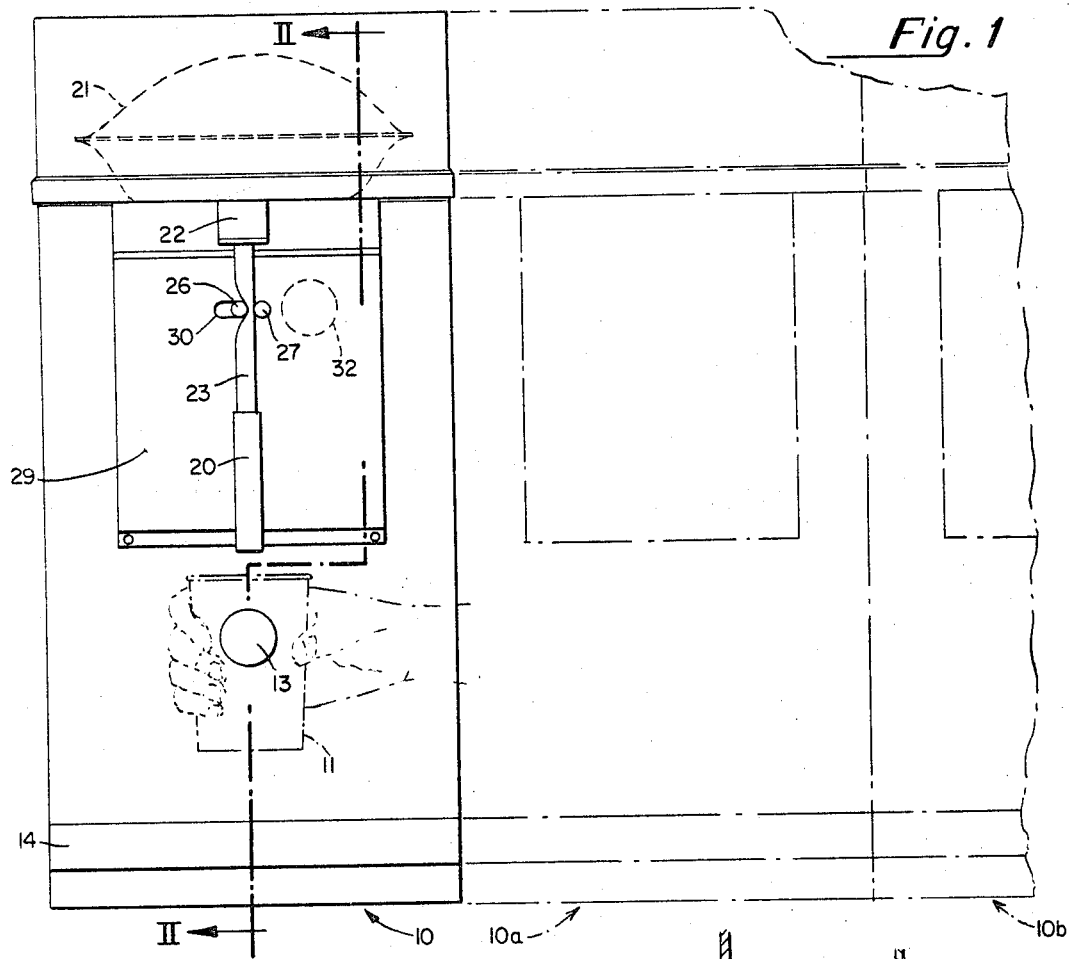
FIG. 1 is a front elevation of one form of the dispensing apparatus of this invention showing in phantom a single drinking cup in filling position and similar additional dispensing units.

Although specific forms of the invention have been selected for illustration in the drawings, and the following description is drawn in specific terms for the purpose of describing these forms of the invention, this description is not intended to limit the scope of the invention which is defined in the appended claims.

Referring to the drawings, FIG. 1 shows the general disposition of a juice machine in accordance with the preferred embodiment of this invention, designated generally 10, as it would appear to a user. The discharge mixing valve 20 is shown conveniently disposed so that a cup 11 may be placed beneath it for receiving the juice dispensed from the machine. The machine is actuated by the push button 13, as will be more fully explained hereinafter.

The drainage rack 14 is suitably disposed beneath the valve 20 for collecting juice, water or other liquids which may be spilled therein.

Figure 2:
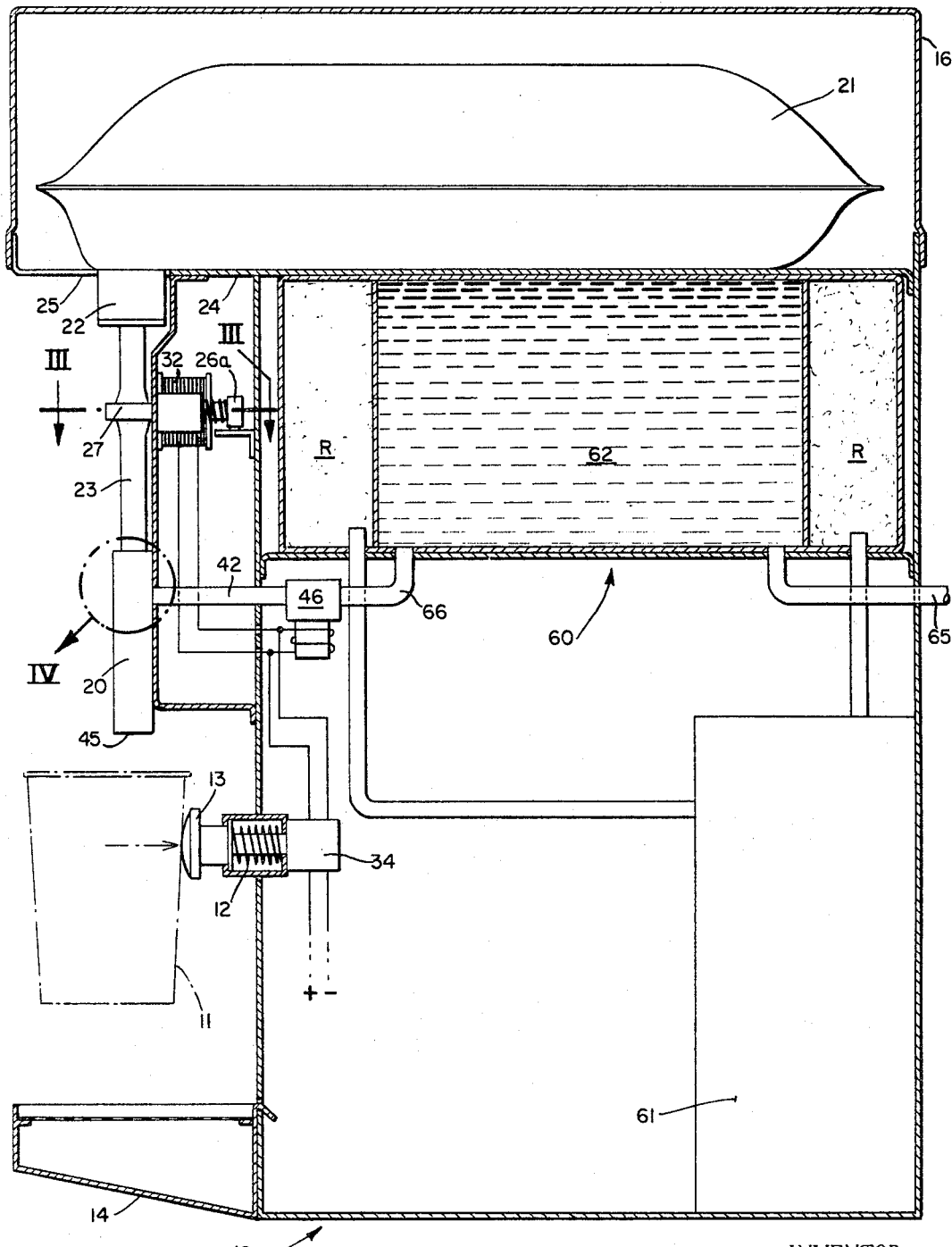
FIG. 2 is a sectional view of the apparatus taken along the line II—II of FIG. 1 showing one form of the internal mechanism of the dispenser in greater detail with the electrical portion thereof shown schematically.

Referring to FIG. 2, the apparatus is shown in greater detail. The juice concentrate is preferably contained in a plastic bag 21 having approximately a two quart capacity. The bag has a discharge fitting thereon 22 to which is connected a rubber hose 23. The bag is disposed on the shelf 24, so that the rubber hose 23 hangs vertically through the slotted opening 25 in the front of the shelf 24.

The top of the machine 16 is preferably made of a colored transparent plastic-like material and rests on the shelf 24 so that the top may be easily lifted to permit access to the juice concentrate bag 21, whereby the bag may be easily removed and discarded and replaced with a new bag.

Figure 3:
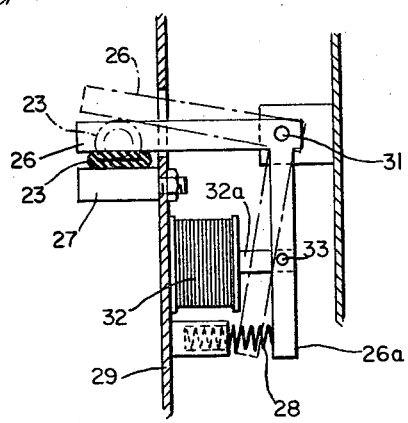
FIG. 3 is a fragmentary sectional view of a portion of of the apparatus taken along the line III—III of FIG. 2 and showing in phantom an alternate position.

Referring to both FIGS. 1 and 3, a bar 26 is shown impinging on the hose 23 and pressing it against the stop 27 so as to prevent juice from flowing therethrough. The spring 28 shown in FIG. 3, is fixedly mounted to the front wall 29 of the machine 10 and engages one leg 26a of the bar 26. The spring 28 is normally under compressive force, so that in its attempt to expand it maintains the bar 26 in contact with the hose 23. As illustrated, the bar passes through a slotted opening 30 in the front wall 29 and is pivoted about the pin 31 which is fixed to the frame of the machine 10, but it will be understood that this is merely an optional means of controlling the bar 26 and that other linkages could be provided within the scope of the invention.

The leg 26a of the bar 26 is rotatably connected at 33 to a solenoid plunger 32a. The solenoid 32 is wired to the push button switch 34 shown in FIG. 2, so that when the switch 34 is closed by pushing the button 13 to the right (FIG. 2) against the force of the spring 12, the solenoid 32 is activated and the plunger 32a moves to the left (FIG. 3) thereby moving the leg 26a of the bar 26 to the left and releasing the grip of the bar 26 on the hose 23, as shown by the phantom alternate position (FIG. 3). The hose 23 is now open and will permit juice concentrate to flow therethrough by gravity from the bag 21.

Figure 4:
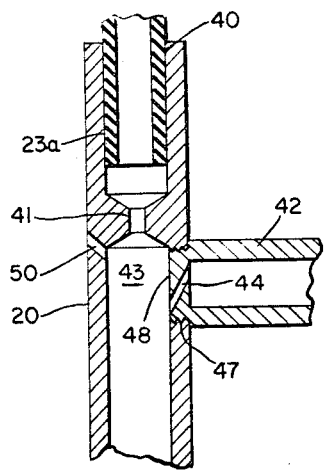
FIG. 4 is a fragmentary sectional view of an enlargement of the portion of the apparatus in the circle designated IV in FIG. 2.

The end 23a of the hose 23 is connected to a unidirectional mixing valve 20, as shown in FIG. 4. The diameter of the hole 40 with respect to the diameter of the hose 23 is such that the flexibility of the hose material provides a suitable seal between the mixing valve 20 and the hose 23, and this in turn provides for a quick disconnect between the two parts. Downstream of this connection, there is a restricted orifice 41 in the mixing valve 20 which has a diameter of approximately 3/32 of an inch in the embodiment shown. However, it will be understood that depending on the consistency of the juice concentrate, this restricted orifice can be varied by substituting appropriately changed mixing valves. Downstream of the restricted orifice 41, a water supply pipe 42 communicates with the mixing chamber 43 by means of an angularly arranged jet 44 which has an axis position substantially between 25° and 35° away from the longitudinal axis of the chamber 43. It has been found that the velocity of the water passing through the jet 44, constructed as described, the water being under normal tap pressure, is sufficient to provide the desired mixing with the concentrate so that juice of a proper consistency is dispensed from the discharge opening 45 (FIG. 2) of the mixing valve 20 into the cup 11 or other container. For this purpose, the jet 44 has a diameter of approximately 1/16 of an inch.

In the water supply line 42 (FIG. 2) there is provided an electrically controlled valve 46. This valve is wired to the push button switch 34 so that when the switch is closed (as previously described) the valve 46 automatically opens the water line 42 allowing water to flow into the mixing chamber 43 (FIG. 4). It is to be noted that simultaneously the solenoid 32 opens the juice supply hose 23 so that the juice concentrate falls by gravity into the mixing chamber 43 and is mixed with the water therein in a predetermined amount.

Where it is desired to produce a foamy juice product, a hole 50 is provided in the wall of the valve 20 to permit the chamber 43 to communicate with the atmosphere. This hole 50 communicates with the chamber 43 in the valve 20 downstream of the restricted orifice 41, but upstream of the water jet 44 and is disposed at an angle of about 45° to the direction of flow through the chamber 43. It has been found that the velocity of the water jet produces a drawing effect on both the air and the juice concentrate, so that air and juice concentrate are drawn into and mixed with the water in the chamber 43. This produces a foaming effect, so that the juice delivered from the discharge 45 of the valve 20 is in a foamy state.

It will be appreciated that various means could be used to chill the ingredients of the juice either separately or together. In the embodiment shown in FIG. 2, the water passes through a cooling apparatus designated generally 60 which provides adequate refrigeration depending on the desired temperature of the juice. The cooling unit 61 is positioned at the bottom of the machine 10 and functions to circulate refrigerant R around the water tank 62. The tank 62 is disposed beneath and in contact with the shelf 24, so that the refrigerant R also functions to keep the juice concentrate in the bag 21 cool.

The water in the inlet conduit 65 is under normal tap pressure, as is the water in the outlet conduit 66 which connects the tank 62 with the valve 46 in the water supply line 42.

An important advantage of this invention derives from the fact that the juice concentrate bag 21 and its attendant hose 23 are easily disposable when evacuated. Likewise they are inexpensive. Thus, the only part of the machine 10 which contacts the juice and which is not disposable, is the unidirectional mixing valve 20. This valve 20 may be easily connected to the water supply pipe 42 by any well known means, as for instance by means of threads 47 (FIG. 4), so that it can be removed and cleaned in a matter of minutes. The face 48 of the supply pipe 42 may be easily wiped clean when the valve 20 has been removed. The rest of the apparatus remains hygienically clean since none of the parts come into contact with any of the perishable food elements.

Another distinct and useful advantage of this machine is that it is electrically operated by means of an easily accessible push button switch (FIGS 1 and 2). Thus a waitress need only press the lightly spring biased button 13 with the same hand she is using to hold the cup 11 and the juice will be automatically dispensed. When she removes her hand, the button 13 will be returned to its position as in FIG. 2 by the spring 12 and the switch 34 will be opened. Very little force is required to press in the button 13 and close the switch 34, which is a very great advantage over any mechanical means which could be provided to release the juice concentrate in the hose 23 or open the water valve 46.

It will be understood that various changes in the details, materials and arrangement of parts which have been herein described and illustrated in order to explain the nature of this invention, may be made by those skilled in the art within the principle and scope of the invention as expressed in the following claims.

Referring again to FIG. 1, it can be seen that a machine of the type described may form a modular section of a larger machine by locating similar machines side by side (10, 10a, 10b). This is of particular advantage for applications where two, three or more types of juice concentrate are desired.

Savings in materials and space can be gained by using one large water tank with multiple water outlets, each connected to a separate water supply pipe and juice mixing valve arrangement, which in turn is connected to a separate bag of juice concentrate. In such an embodiment, separate push buttons and electric valves are provided for each mixing valve arrangement.

What is claimed is:
1. An apparatus for dispensing juice, comprising:
 (a) disposable bag containing juice concentrate having a single outlet therein and a hose connected at one end to said single outlet, said hose being disposed vertically downward from said bag, for supplying said juice concentrate by gravity feed;
 (b) water supply means for supplying and electrically actuated means for controlling water to mix with said juice concentrate supplied by gravity;
 (c) a chamber having a first inlet connected to the other end of said hose, a second inlet connected to said water supply means, a discharge outlet downstream of both of said inlets, and a restricted orifice downstream of said first inlet and upstream of said second inlet, said second inlet comprising a jet disposed at an acute angle with the direction of flow through said chamber, said jet being smaller in diameter than said restricted orifice;
 (d) electrically actuated control means engaging said disposable bag to control the amount of juice concentrate supplied thereby; and
 (e) switch means connected to both of said electrically actuated means for simultaneously actuating both of said means upon a single electrical impulse.

2. An apparatus as in claim 1 wherein there is provided a passage comunicating said chamber with the atmosphere, the end of said passage in communication with said chamber being disposed between said restricted orifice and said jet.

3. An apparatus as in claim 1 wherein refrigeration means is disposed in said apparatus for cooling the contents of said apparatus.

4. An apparatus as in claim 1 wherein said electrically actuated control means comprises means to normally engage said hose and restrict the flow of juice concentrate therethrough; and means connected to said last mentioned means to remove said last mentioned means from its engagement with said hose upon said electrical impulse whereby juice concentrate is permitted to flow through said hose.

5. An apparatus as in claim 1 wherein said electrically actuated control means comprises: clamp means normally engaging said hose to close said hose; solenoid means connected to said clamp means and connected to said switch means to actuate said solenoid means, whereby on the closing of said switch means said solenoid means will actuate said clamp means to release said hose.

References Cited
UNITED STATES PATENTS

| | | | |
|---|---|---|---|
| 2,895,642 | 7/1959 | Bauerlein | 222—129.2 X |
| 3,001,557 | 9/1961 | Kuckens | 222—129.1 X |
| 3,209,797 | 10/1965 | Marchetti | 222—129.2 |
| 3,212,681 | 10/1965 | Weikert | 222—183 |

ROBERT B. REEVES, *Primary Examiner.*

HADD S. LANE, *Assistant Examiner.*